US010085187B2

(12) United States Patent
Sakurai et al.

(10) Patent No.: US 10,085,187 B2
(45) Date of Patent: Sep. 25, 2018

(54) BASE STATION, TERMINAL, AND COMMUNICATION CONTROL METHOD

(71) Applicant: Panasonic Corporation, Osaka (JP)

(72) Inventors: Toshiaki Sakurai, Kanagawa (JP); Seigo Nakao, Singapore (SG)

(73) Assignee: Panasonic Corporation, Osaka (JP)

( * ) Notice: Subject to any disclaimer, the term of this patent is extended or adjusted under 35 U.S.C. 154(b) by 46 days.

(21) Appl. No.: 15/502,756

(22) PCT Filed: Jun. 26, 2015

(86) PCT No.: PCT/JP2015/003217
§ 371 (c)(1),
(2) Date: Feb. 8, 2017

(87) PCT Pub. No.: WO2016/110884
PCT Pub. Date: Jul. 14, 2016

(65) Prior Publication Data
US 2017/0245186 A1    Aug. 24, 2017

(30) Foreign Application Priority Data
Jan. 5, 2015    (JP) ................... 2015-000313

(51) Int. Cl.
*G06F 15/00*    (2006.01)
*H04W 36/04*    (2009.01)
(Continued)

(52) U.S. Cl.
CPC ........... *H04W 36/04* (2013.01); *H04W 36/08* (2013.01); *H04W 36/165* (2013.01); *H04W 36/32* (2013.01); *H04W 16/32* (2013.01)

(58) Field of Classification Search
CPC ..... H04W 88/16; H04W 24/02; H04W 36/04; H04W 36/08
(Continued)

(56) References Cited

U.S. PATENT DOCUMENTS

2014/0004863 A1*    1/2014    Zhang ............... H04W 36/0033
455/444

FOREIGN PATENT DOCUMENTS

JP    2014-165762 A    9/2014

OTHER PUBLICATIONS

3GPP Workshop on Release 12 and onwards, "Requirements, Candidate Solutions & Technology Roadmap for LTE-Rel-12 Onward," RWS-120010, NTT DOCOMO, Inc., Ljubljana, Slovenia, Jun. 11-12, 2012, 27 pages.
(Continued)

*Primary Examiner* — Sam Bhattacharya
(74) *Attorney, Agent, or Firm* — Seed IP Law Group LLP

(57) ABSTRACT

Provided is a base station that enables data communications in a small cell to continue even if a handover between macro cells occurs. In the base station (100), a handover determination unit (105) determines whether the handover of a control plane from the base station (100) to another macro cell is necessary for a terminal. If it is determined that the handover is necessary, a radio resource control unit (109) and a slave radio resource control unit (110) continue the control of a user plane communication process when the terminal is located inside a small cell, and the radio resource control unit (109) and slave radio resource control unit (110) stop the control of the user plane communication process and perform a process of handover to the other macro cell when the terminal is located outside the small cell.

10 Claims, 11 Drawing Sheets

(51) Int. Cl.
*H04W 36/08* (2009.01)
*H04W 36/16* (2009.01)
*H04W 36/32* (2009.01)
*H04W 16/32* (2009.01)

(58) Field of Classification Search
USPC ......... 455/436, 437, 444; 370/328, 331, 338
See application file for complete search history.

(56) References Cited

OTHER PUBLICATIONS

International Search Report dated Sep. 15, 2015, for corresponding International Application No. PCT/JP2015/003217, 2 pages.

* cited by examiner

BASE STATION, TERMINAL, AND COMMUNICATION CONTROL METHOD

TECHNICAL FIELD

The present disclosure relates to a base station, a terminal and a communication control method.

BACKGROUND ART

In recent years, as a technique for improving the frequency utilization efficiency and/or the like, a heterogeneous network has been under study, in which a macro cell being a base station (may be referred to as "eNB") having high transmission power and a small cell being a base station having low transmission power are disposed in a mixed manner.

Splitting between a Control plane (hereinafter, referred to as "C-Plane") and a data plane (User plane) (hereinafter, referred to as "U-Plane") (C/U split) in a communication system forming the heterogeneous network has been proposed. More specifically, during C/U split, the macro cell maintains connectivity by mobility management using the C-Plane while the small cell handles the U-Plane using a wideband frequency, thereby providing high throughput (e.g., see Non-Patent Literature (hereinafter, referred to as "NPL") 1).

Furthermore, the macro cell determines whether handover (HO) of a terminal to another macro cell is required or not on the basis of reception quality information (Measurement Report) provided as a feedback from the terminal (may be referred to as a mobile station (MS) or user equipment (UE)).

CITATION LIST

Patent Literature

PTL 1
Japanese Patent Application Laid-Open No. 2014-165726

Non-Patent Literature

NPL 1
Requirements, Candidate Solutions, & Technology Roadmap for LTE Rel-12 Onward NTT DOCOMO, RWS-120010, June 2012

SUMMARY OF INVENTION

Technical Problem

During C/U split, when a small cell is disposed near the boundary of a macro cell, there may be a case where the reception quality between the small cell and a terminal is favorable, but the reception quality between the macro cell and the terminal is poor, so that inter-macro-cell handover (handover between macro cells) for the terminal occurs. In this case, the macro cell performing C-Plane communication where control of the communication processing of U-Plane is performed is switched to another due to the inter-macro-cell handover, so that the U-Plane communication is interrupted. Accordingly, there arises a problem in that U-Plane communication in a small cell, which is not supposed to be affected, is disconnected when inter-macro-cell handover occurs while the small cell is disposed near the boundary of a macro cell during C/U split.

An aspect of this disclosure aims at providing a base station, a terminal, and a communication control method each making it possible to continue data communication in a small cell even when inter-macro-cell handover occurs.

Solution to Problem

A base station according to an aspect of this disclosure is a base station in a communication system where a small cell performs user-plane (U-Plane) communication and a macro cell performs control-plane (C-Plane) communication in which control of communication processing of the U-Plane is performed for the terminal, the base station being the macro cell in the communication system and including: a first determining section that determines whether handover of the C-Plane from the base station to another macro cell for the terminal is required; and a control section that, in a case where the handover is determined to be required, continues the control of the communication processing of the U-Plane when the terminal is located within a coverage area of the small cell, but stops the control of the communication processing of the U-Plane and performs handover processing to the other macro cell when the terminal is located outside the coverage area of the small cell.

A terminal according to an aspect of this disclosure is a terminal in a communication system where a small cell performs user-plane (U-Plane) communication and a macro cell performs control-plane (C-Plane) communication in which control of communication processing of the U-Plane is performed for the terminal, the terminal including: a transmission and reception section that receives, from the macro cell, a message instructing the C-Plane communication with another macro cell and transmits a response to the message to the other macro cell; and a control section that continues using a communication configuration of the U-Plane when the terminal is located within a coverage area of the small cell, but performs reconfiguration of the U-Plane communication when the terminal is located outside the coverage area of the small cell, in a case where the message contains information instructing maintaining of the communication configuration of the U-Plane.

A communication control method according to an aspect of this disclosure is a method in a communication system where a small cell performs user-plane (U-Plane) communication and a macro cell performs control-plane (C-Plane) communication in which control of communication processing of the U-Plane is performed for a terminal, the method including: determining whether handover of the C-Plane from the base station to another macro cell for the terminal is required; and continuing the control of the communication processing of the U-Plane when the terminal is located within a coverage area of the small cell, but stopping the control of the communication processing of the U-Plane when the terminal is located outside the coverage area of the small cell and performing handover processing to the other macro cell, in a case where the handover is determined to be required.

A communication control method according to an aspect of this disclosure is a method in a communication system where a small cell performs user-plane (U-Plane) communication and a macro cell performs control-plane (C-Plane) communication in which control of communication processing of the U-Plane is performed for a terminal, the method including: receiving, from the macro cell, a message instructing the C-Plane communication with another macro cell and transmitting a response to the message to the other macro cell; and continuing using a communication configuration of the U-Plane when the terminal is located within a coverage area of the small cell, but performing reconfiguration of the U-Plane communication when the terminal is located outside the coverage area of the small cell, in a case where the message contains information instructing maintaining of the communication configuration of the U-Plane.

Advantageous Effects of Invention

According to an aspect of the present disclosure, it is made possible to continue data communication in a small cell even when inter-macro-cell handover occurs.

DESCRIPTION OF EMBODIMENTS

Hereinafter, a detailed description will be given of an embodiment according to an aspect of the present disclosure with reference to the accompanying drawings.

[Background for Arriving at Invention According to Aspect of this Disclosure]

Figure 1:
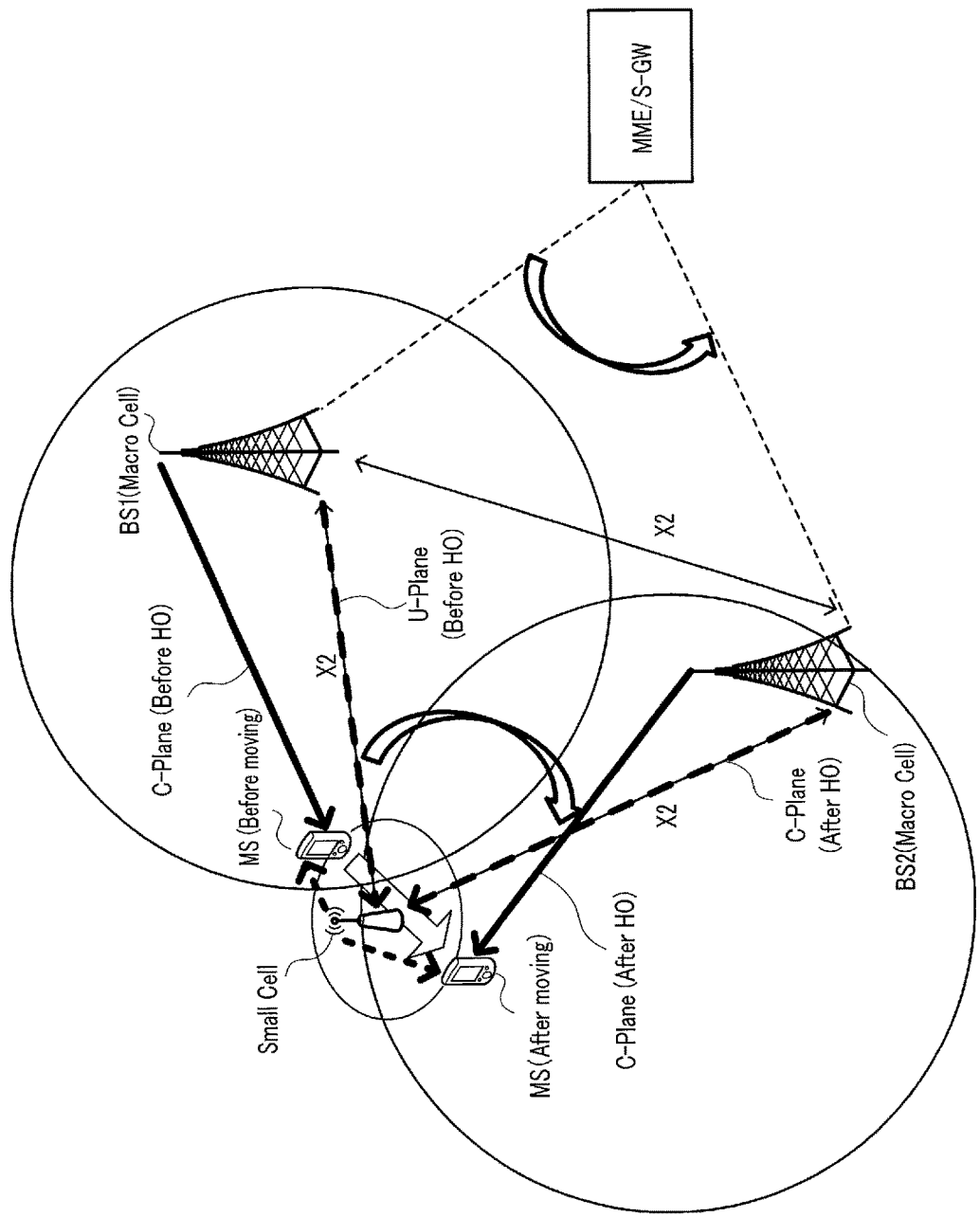
FIG. 1 is a diagram illustrating an operation example of handover processing in an existing communication system.

FIG. 1 is a diagram illustrating an example of C-Plane and U-Plane operations during handover in a communication system forming an existing heterogeneous network. The communication system illustrated in FIG. 1 includes a mobility management entity (MME)/serving gateway (S-GW) of a core network, and macro cells (BS1 and BS2), a small cell, and a terminal (MS).

FIG. 1 illustrates how MS moves to the macro cell of BS2 from the macro cell of BS1.

Moreover, the small cell illustrated in FIG. 1 is disposed near the boundary between the areas covered by BS1 and BS2. The communication form for MS illustrated in FIG. 1 is C/U split, and the macro cells perform communication using C-Plane while the small cell performs communication using U-Plane. More specifically, during C-Plane communication, control data from MME/S-GW ((hereinafter, may be referred to as "C-Plane Data") solid lines illustrated in FIG. 1) is transmitted to MS from macro-cell base stations. Meanwhile, during U-Plane communication, user data from MME/S-GW ((hereinafter, may be referred to as "U-Plane Data") broken lines illustrated in FIG. 1) is transmitted to MS from the small-cell base station via the macro-cell base stations. For inter-base-station communication (macro cells and small cell), an X2 interface is used.

Figure 2:
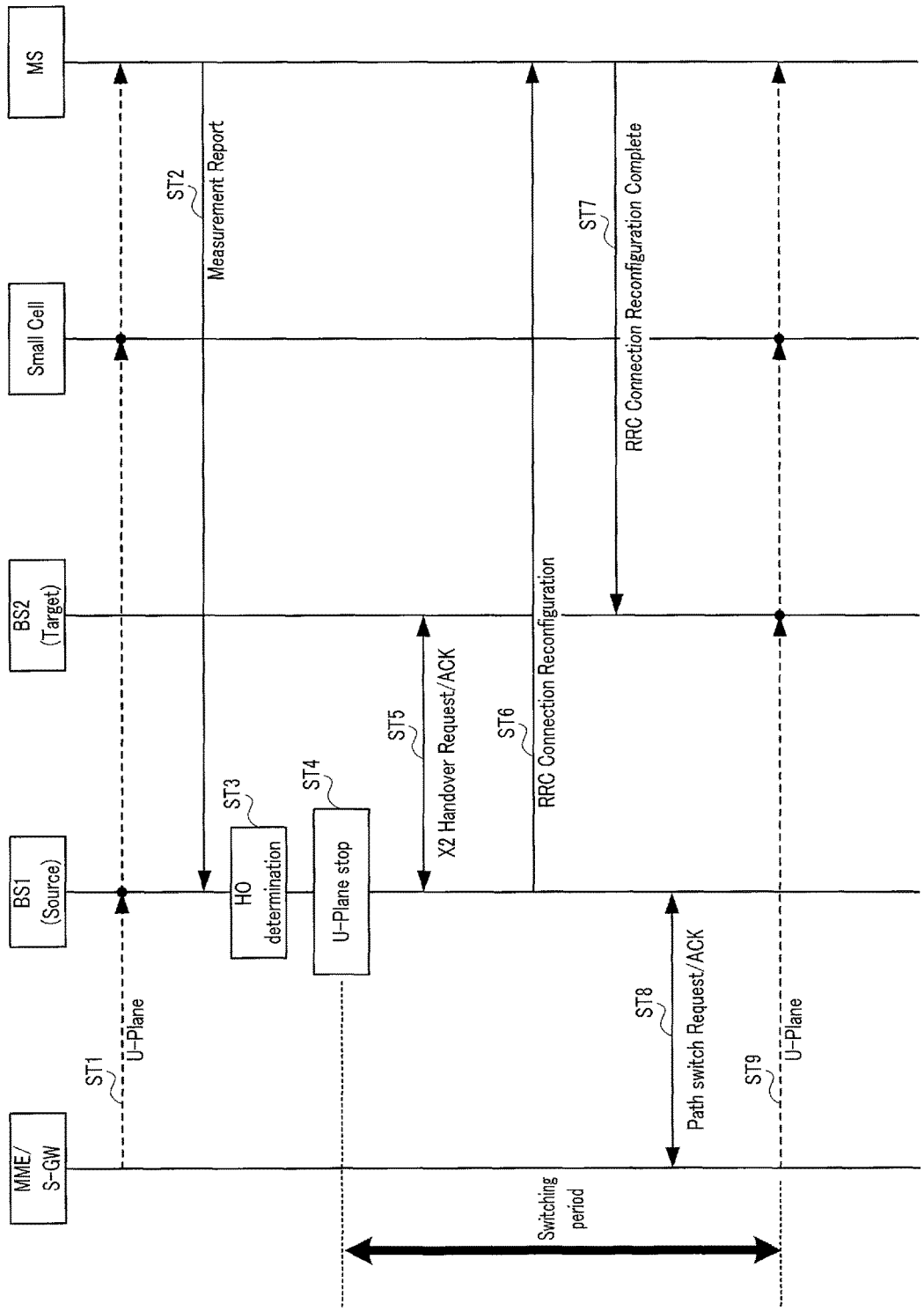
FIG. 2 is a sequence diagram illustrating an operation example of existing inter-macro-cell handover.

FIG. 2 is a sequence diagram illustrating an operation of a case where handover for MS from BS1 to BS2 is performed in the communication system illustrated in FIG. 1.

In FIG. 2, U-Plane data from MME/S-GW is transmitted from the small cell to MS via BS1 in step (hereinafter, expressed as "ST" for simplicity) 1. In ST2, MS feeds back to BS1, Measurement Report containing reception quality information measured using a reference signal (not illustrated) transmitted from each of the base stations. The timing at which Measurement Report is fed back may be a given timing or a timing at which a given condition is satisfied.

In ST3, BS1 determines whether handover (HO) for MS from BS1 to the other macro cell is required or not on the basis of Measurement Report received in ST2.

When macro-cell handover for MS is determined to be required, a forwarding path (X2 interface) of U-Plane data is switched in association with switching between macro cells. In FIG. 1, the forwarding path of U-Plane data for MS to the small cell is switched from BS1 to BS2.

In addition, security (secret) processing is applied to U-Plane data in the packet data convergence protocol (PDCP) layer. A parameter (such as COUNT value) used in the security processing in the PDCP layer is controlled by the RRC layer (i.e., C-Plane). Accordingly, during inter-macro-cell handover, the macro cell managing the security processing in the PDCP layer is switched to another, and thus, information about the security processing is not taken over by the handover-destination macro cell.

In this respect, when handover is determined to be required, BS1 stops control of the communication processing of U-Plane in ST4. More specifically, transmission of U-Plane data from BS1 to the small cell is stopped.

In ST5, BS1 (source cell) transmits, using an X2 interface, a message requesting handover (X2 Handover Request) to BS2 which is the handover destination (target cell) of MS. When accepting the handover request from BS1, BS2 transmits a response (ACK) to the handover request to BS1 (ST5).

In ST6, BS1 transmits to MS via radio resource control (RRC) signaling, a message (RRC Connection Reconfiguration) instructing MS to perform reconfiguration of connection for performing C-Plane communication with BS2 which is the handover destination. MS performs reconfiguration of connection with BS2 on the basis of RRC Connection Reconfiguration received in ST5. For example, MS reconfigures (re-establishes) the parameter used in the security processing (e.g., resets the COUNT value). In ST7, MS transmits a message (RRC Connection Reconfiguration Complete) indicating completion of the reconfiguration to BS2 which is the handover destination.

Moreover, in ST8, BS1 transmits a message (Path switch Request) requesting MME/S-GW to change the communication paths of C-Plane data and U-Plane data from BS1 to BS2, and when accepting the change request from BS1, MME/S-GW transmits a response (ACK) to the change request to BS1.

In the manner described above, handover for MS is complete, and as illustrated in FIG. 1, the paths of C-Plane data and U-Plane data are switched from BS1 to BS2. More specifically, U-Plane data from MME/S-GW is transmitted to MS from the small cell via BS2 (ST9). In addition, C-Plane data from MME/S-GW is transmitted to MS from BS2.

As illustrated in FIG. 1, even when MS moves from the cell of BS1 to the cell of BS2, since MS is in the small cell, the U-Plane communication environment between MS and the small cell remains favorable. However, as illustrated in FIG. 2, when handover between macro cells (BS1 and BS2) occurs, MS cannot transmit or receive U-Plane data regardless of the communication environment between MS and the small cell during a switching period from stopping of transmission of U-Plane data (ST4) to start of transmission of U-Plane data via BS2 which is the handover destination (ST9).

As described above, there is a problem in that U-Plane communication by a small cell also stops when inter-macro-cell handover related to C-Plane in a communication system during C/U split occurs. For example, until a parameter of security processing in a handover-destination macro cell is determined, U-Plane data communication is interrupted. In particular, the reception quality with a macro cell in MS located at the boundary of the macro cell is unstable, so that C-Plane handover is likely to occur often. Accordingly, even when the reception quality of a U-Plane communication path between MS and a small cell is favorable, the frequency of interruptions of U-Plane communication becomes high.

In this respect, the invention according to an aspect of the present disclosure aims at making it possible to continue data communication in a small cell even when inter-macro-cell handover occurs.

Embodiment 1

A communication system according to Embodiment 1 employs a configuration similar to that illustrated in FIG. 1. In other words, in this communication system, the communication form of C/U split can be applied, in which a small cell performs U-Plane communication and a macro cell perform C-Plane communication where control of the communication processing of U-Plane is performed.

For example, in FIG. 1, the macro cells (BS1 and BS2) are each a base station that performs communication using a microwave band, and the small cell is a small base station that performs communication using a microwave band.

[Configuration of Base Station]

Figure 3:
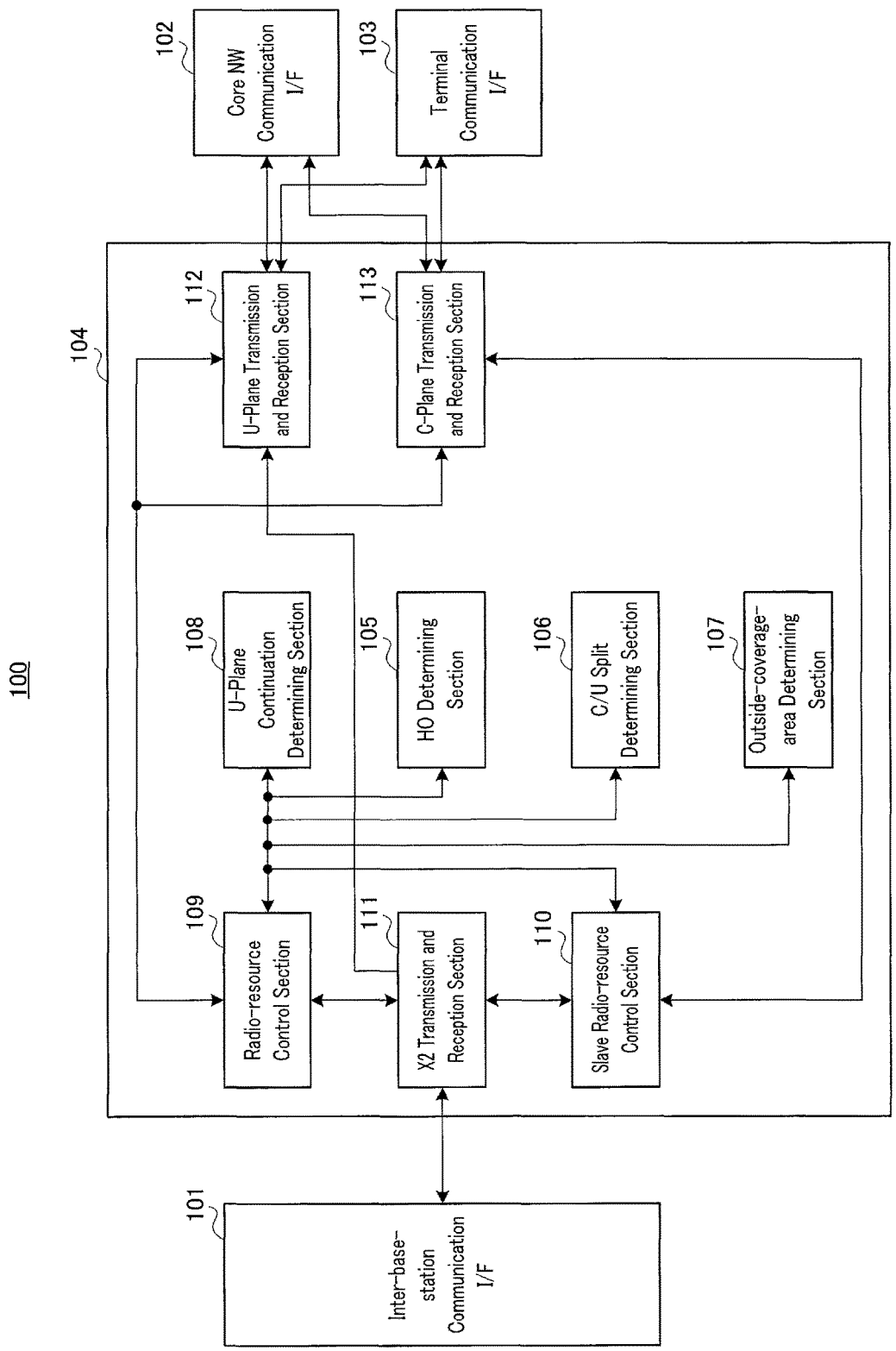
FIG. 3 is a diagram illustrating a configuration of a base station according to Embodiment 1.

FIG. 3 is a block diagram illustrating a configuration of base station 100 according to Embodiment 1. Base stations 100 are each a macro-cell base station (BS1 and BS2 illustrated in FIG. 1). Base station 100 includes inter-base-station communication interface (I/F) 101, core NW communication I/F 102, terminal communication I/F 103, and control section 104.

Inter-base-station communication I/F 101 performs communication with other base stations (macro cell and small cell) using an X2 interface. During C/U split, inter-base-station communication I/F 101 transmits and receives U-Plane data to and from a small cell connected to base station 100 (macro cell). Inter-base-station communication I/F 101 transmits and receives C-Plane data to and from the other macro cell during a slave operation.

Core NW communication I/F 102 performs communication with apparatuses in a core network including MME/S-GW.

Terminal communication I/F 103 performs communication with a terminal connected to base station 100. For example, terminal communication I/F 103 receives Measurement Report from a terminal using C-Plane. In addition, during C/U split, terminal communication I/F 103 performs communication (e.g., such as RRC Connection Reconfiguration) with a terminal connected to base station 100 (macro cell), using C-plane.

Control section 104 performs the communication processing of C-Plane and U-Plane, and handover processing. Control section 104 includes HO determining section 105, C/U split determining section 106, outside-coverage-area determining section 107, U-Plane continuation determining section 108, radio-resource control section 109, slave radio-resource control section 110, X2 transmission and reception section 111, U-Plane transmission and reception section 112, and C-Plane transmission and reception section 113.

HO determining section 105 determines whether C-Plane handover for a terminal from the base station of HO determining section 105 to the other macro cell is required or not. More specifically, HO determining section 105 determines whether macro-cell handover for a terminal is required or not on the basis of the reception quality level between each of the macro cells and the terminal, which is indicated in Measurement Report transmitted from the determination target terminal. For example, when the reception quality level between the base station of HO determining section 105 and the terminal is less than a given threshold and the reception quality level between a base station adjacent to the base station of HO determining section 105 and the terminal is not less than the given threshold, HO determining section 105 determines that handover for the terminal to the adjacent macro cell from the base station of HO determining section 105 is required. HO determining section 105 outputs the result of determination to C/U split determining section 106, outside-coverage-area determining section 107 and radio-resource control section 109.

C/U split determining section 106 determines whether the terminal that has been determined by HO determining section 105 as a handover required terminal is in a C/U split state or not. For example, C/U split determining section 106 previously holds information indicating whether C/U split is applied to the terminal or not. C/U split determining section 106 outputs the result of determination to U-Plane continuation determining section 108.

Outside-coverage-area determining section 107 determines whether the terminal that has been determined in HO determining section 105 as being a handover required terminal is located within or outside the coverage area of the small cell. For example, outside-coverage-area determining section 107 may determine that the terminal is located within the coverage area of the small cell when the reception quality level between the small cell and the terminal indicated by Measurement Report and/or the like is not less than a given threshold. Alternatively, outside-coverage-area determining section 107 may determine the state of the terminal being within or outside the coverage area (hereinafter, referred to as "within or outside-coverage-area state") in the small cell on the basis of information indicating whether the terminal is within or outside the coverage area, which is determined by the terminal with respect to the small cell (e.g., information contained in Measurement Report). Outside-coverage-area determining section 107 outputs the result of determination to U-Plane continuation determining section 108.

U-Plane continuation determining section 108 determines whether or not to continue control of the communication processing of U-Plane in base station 100 for the terminal that has been determined in HO determining section 105 as a handover required terminal. More specifically, when the communication form of the handover target terminal is a C/U split state and also the terminal is located within the coverage area of a small cell, U-Plane continuation determining section 108 determines to continue control of the communication processing of U-Plane in base station 100. Meanwhile, when the communication form of the handover target terminal is not a C/U split state or the terminal is located outside the coverage area of the small cell, U-Plane continuation determining section 108 determines to stop control the communication processing of U-Plane in base station 100. U-Plane continuation determining section 108 outputs the result of determination to radio-resource control section 109 and slave radio-resource control section 110.

Radio-resource control section 109 and slave radio-resource control section 110 determine whether to continue or to stop control of the communication processing of U-Plane for the handover target terminal in accordance with the result of determination of U-Plane continuation determining section 108.

Radio-resource control section 109 controls the communication processing of U-Plane and the communication processing of C-Plane.

Radio-resource control section 109 performs handover control and mobility control for the terminal when it is determined in U-Plane continuation determining section 108 not to continue control of the communication processing of U-Plane for the handover target terminal in base station 100.

More specifically, radio-resource control section 109 stops control of the communication processing of U-Plane for the handover target terminal. Subsequently, radio-resource control section 109 transmits a handover request (X2 Handover Request) to the handover-destination macro cell via X2 transmission and reception section 111. Subsequently, upon reception of ACK for the handover request from the handover-destination macro cell, radio-resource control section 109 transmits to the handover target terminal via C-Plane transmission and reception section 113 a message instructing reconfiguration of connection (RRC Connection Reconfiguration) for performing C-Plane communication with the handover-destination macro cell.

Upon reception of a handover request (X2 Handover Request) from another macro cell via X2 transmission and reception section 111, radio-resource control section 109 determines that the base station of radio-resource control section 109 is the handover destination. In this case, upon reception of a message indicating completion of the reconfiguration of connection (RRC Connection Reconfiguration Complete) by handover from the handover target terminal, radio-resource control section 109 starts U-Plane communication (forwarding) with the small cell via X2 transmission and reception section 111 and starts C-Plane communication with the terminal via C-Plane transmission and reception section 113.

Meanwhile, when it is determined in U-Plane continuation determining section 108 to continue control of the communication processing of U-Plane for the handover target terminal in base station 100, radio-resource control section 109 continues the communication processing of U-Plane data (forwarding processing) with the small cell for the terminal. More specifically, radio-resource control section 109 performs transmission and reception processing of U-Plane data to and from the small cell via X2 transmission and reception section 111.

When it is determined in U-Plane continuation determining section 108 to continue control of the communication processing of U-Plane for the handover target terminal in base station 100, slave radio-resource control section 110 controls the communication processing of C-Plane for the terminal. More specifically, slave radio-resource control section 110 transmits a handover request (X2 C-Plane Slave Request) of the physical channel of C-Plane data to the handover-destination macro cell via X2 transmission and reception section 111.

Hereinafter, regarding C-Plane communication, causing handover for only the communication processing of physical channel may be referred to as causing "slave operation." More specifically, in the slave operation, a handover-source macro cell (master cell) continues performing control of the communication processing of C-Plane, and a handover-destination macro cell (slave cell) transmits to the terminal C-Plane data forwarded from the handover-source macro cell. In other words, the slave cell relays C-Plane data between the master cell and the terminal.

Subsequently, upon reception of ACK from the handover-destination macro cell for a handover request (X2 C-Plane Slave Request), slave radio-resource control section 110 transmits, via C-Plane transmission and reception section 113, a message instructing reconfiguration of connection (RRC Connection Reconfiguration) for performing C-Plane communication with the handover-destination macro cell to the handover target terminal. However, this message contains information instructing continuation of the control of the communication processing of U-Plane for the terminal by base station 100 (i.e., maintaining of the currently configured communication configuration of U-Plane).

Upon reception of a handover request (X2 C-Plane Slave Request) instructing a slave operation from another macro cell via X2 transmission and reception section 111, slave radio-resource control section 110 determines that the base station of slave radio-resource control section 110 is the handover destination (slave cell) for the communication processing of the physical channel of C-Plane. In this case, upon reception of a message indicating completion of reconfiguration of connection (RRC Connection Reconfiguration Complete) by handover from the handover-target terminal, slave radio-resource control section 110 transmits (relays), via X2 transmission and reception section 111, the message to the handover-source macro cell (master cell). From this point forward, slave radio-resource control section 110 transmits (relays) the U-Plane data transmitted from the handover-source macro cell via X2 transmission and reception section 111 to the terminal via U-Plane transmission and reception section 112.

As described above, in a case where handover for a terminal in a C/U split state is determined to be required, radio-resource control section 109 and slave radio-resource control section 110 continue control of the communication processing of U-Plane when the terminal is located within the coverage area of the small cell, but stops control of the communication processing of U-Plane and performs handover processing to another macro cell when the terminal is located outside the coverage area of the small cell.

X2 transmission and reception section 111 transmits and receives C-Plane data and U-Plane data to and from another base station (macro cell or small cell) via inter-base-station communication I/F 101. When control of the communication processing of U-Plane is continued in slave radio-resource control section 110 during handover, X2 transmission and reception section 111 transmits a message requesting relay of C-Plane data (X2 C-Plane Slave Request) between base station 100 and the terminal to the other macro cell (slave cell) and receives ACK from the other macro cell for the message.

U-Plane transmission and reception section 112 transmits and receives U-Plane data to and from a core network (including MME/S-GW) or a terminal via core NW communication I/F 102 or terminal communication I/F 103. For example, U-Plane transmission and reception section 112 outputs U-Plane data (data forwarded from a small cell) received from X2 transmission and reception section 111 to core NW communication I/F 102.

C-Plane transmission and reception section 113 transmits and receives C-Plane data to and from a core network (including MME/S-GW) or a terminal via core NW communication I/F 102 or terminal communication I/F 103. When control of the communication processing of U-Plane is continued in slave radio-resource control section 110 during handover, C-Plane transmission and reception section 113 transmits a message containing information instructing maintaining of a communication configuration of U-Plane and information instructing reconfiguration of C-Plane communication with another macro cell (slave cell) (RRC Connection Reconfiguration) to the terminal and receives from the terminal via the other macro cell a message reporting completion of the reconfiguration (RRC Connection Reconfiguration Complete).

[Configuration of Terminal 200]

Figure 4:
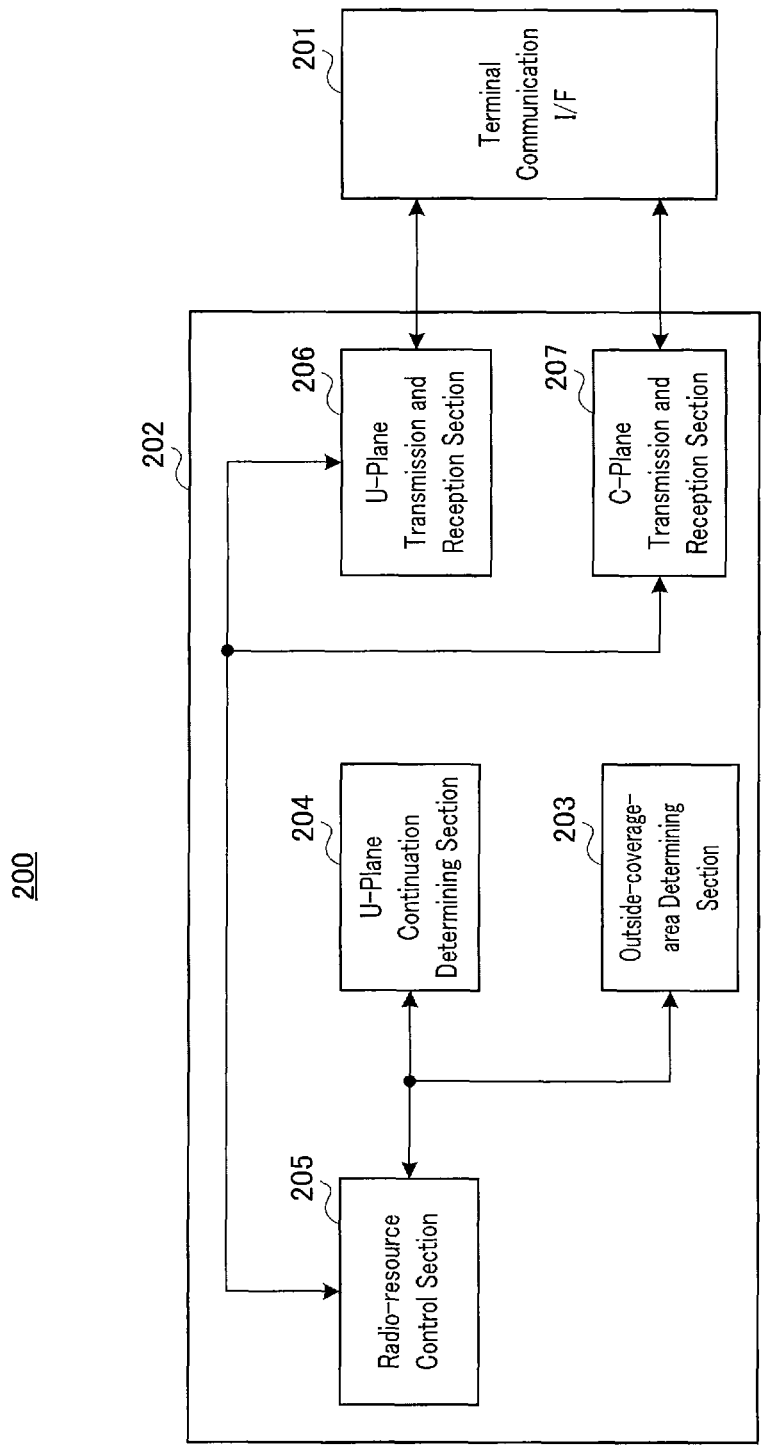
FIG. 4 is a block diagram illustrating a configuration of a terminal according to Embodiment 1.

FIG. 4 is a block diagram illustrating a configuration of terminal 200 according to Embodiment 1. In FIG. 4, terminal 200 includes terminal communication I/F 201, and control section 202.

Terminal communication I/F 201 performs communication with a base station (macro cell or small cell) to which terminal 200 is connected. For example, terminal communication I/F 201 performs communication (for example, RRC Connection Reconfiguration and/or the like) with base station 100 (macro cell) using C-Plane and performs communication with a small cell using U-Plane during C/U split.

Control section 202 performs the communication processing of C-Plane and U-Plane, and handover processing. Control section 202 includes outside-coverage-area determining section 203, U-Plane continuation determining section 204, radio-resource control section 205, U-Plane transmission and reception section 206, and C-Plane transmission and reception section 207.

Outside-coverage-area determining section 203 determines whether terminal 200 is located within or outside the coverage area of a small cell. For example, when the reception quality level between the small cell and terminal 200 is not less than a given threshold, outside-coverage-area determining section 203 determines that terminal 200 is located within the coverage area of the small cell. Outside-coverage-area determining section 203 outputs the result of determination to U-Plane continuation determining section 204.

U-Plane continuation determining section 204 determines whether or not to continue the U-Plane communication by terminal 200 on the basis of the current communication configuration. More specifically, U-Plane continuation determining section 204 receives from radio-resource control section 205 a message instructing reconfiguration of connection (RRC Connection Reconfiguration) for performing C-Plane communication with the handover-destination macro cell. U-Plane continuation determining section 204 determines to continue U-Plane communication when the message contains information instructing maintaining of the communication configuration of C-Plane, and the result of determination of outside-coverage-area determining section 203 indicates a within-coverage-area state. Meanwhile, U-Plane continuation determining section 204 determines not to continue U-Plane communication when the message does not contain the information instructing maintaining of the communication configuration of C-Plane, or the result of determination of outside-coverage-area determining section 203 indicates an outside-coverage-area state. U-Plane continuation determining section 204 outputs the result of determination to radio-resource control section 205.

Radio-resource control section 205 measures a reception quality level with a macro cell or small cell and transmits the result of measurement as Measurement Report to the macro cell via C-Plane transmission and reception section 207.

Moreover, when it is determined in U-Plane continuation determining section 204 not to continue U-Plane communication, radio-resource control section 205 performs reconfiguration of U-Plane communication by general handover (e.g., see FIG. 2). For example, radio-resource control section 205 reconfigures (re-establishes) a parameter of security processing in the PDCP layer. Moreover, upon completion of reconfiguration of connection, radio-resource control section 205 transmits a message indicating the completion of reconfiguration (RRC Connection Reconfiguration Complete) to the handover-destination macro cell via C-Plane transmission and reception section 207. After completion of handover processing, radio-resource control section 205 starts C-Plane communication with the small cell via U-Plane transmission and reception section 206 and C-Plane communication with the handover-destination macro cell via C-Plane transmission and reception section 207.

Meanwhile, when it is determined in U-Plane continuation determining section 204 to continue U-Plane communication, radio-resource control section 205 performs reconfiguration of connection by handover for only the communication processing of the physical channel of U-Plane data. More specifically, radio-resource control section 205 switches the macro cell that performs C-Plane data communication to another. In response to this, radio-resource control section 205 continues using the communication configuration of U-Plane. For example, radio-resource control section 205 maintains the parameter of security processing in the PDCP layer. Accordingly, radio-resource control section 205 continues U-Plane communication with the small cell via U-Plane transmission and reception section 206 even during handover processing.

Moreover, upon completion of reconfiguration of connection, radio-resource control section 205 transmits a message indicating the completion of reconfiguration (RRC Connection Reconfiguration Complete) to the handover-destination macro cell for C-Plane via C-Plane transmission and reception section 207. This message is forwarded from the handover-destination macro cell (slave cell) to the handover-source macro cell (master cell). After completion of handover processing, radio-resource control section 205 starts C-Plane communication with the handover-destination macro cell via C-Plane transmission and reception section 207.

As described above, when the message from a macro cell contains information instructing maintaining of a communication configuration of the U-Plane, radio-resource control section 205 continues using the communication configuration of U-Plane when terminal 200 is located within the coverage area of the small cell, but reconfigures U-Plane communication (reset the current configuration) when terminal 200 is located outside the coverage area of the small cell.

U-Plane transmission and reception section 206 transmits and receives U-Plane data to and from a macro cell or a small cell via terminal communication I/F 201. C-Plane transmission and reception section 207 transmits and receives C-Plane data to and from a macro cell or a small cell via terminal communication I/F 201. C-Plane transmission and reception section 207 receives from a macro cell (master cell) to which terminal 200 is connected a message instructing C-Plane communication with another macro cell (slave cell), and transmits ACK for the message to the other macro cell.

[Operations of Base Station 100 and Terminal 200]

A description will be given of operations of base station 100 and terminal 200 having the above described configurations.

[Operations of Base Station 100]

Figure 5:
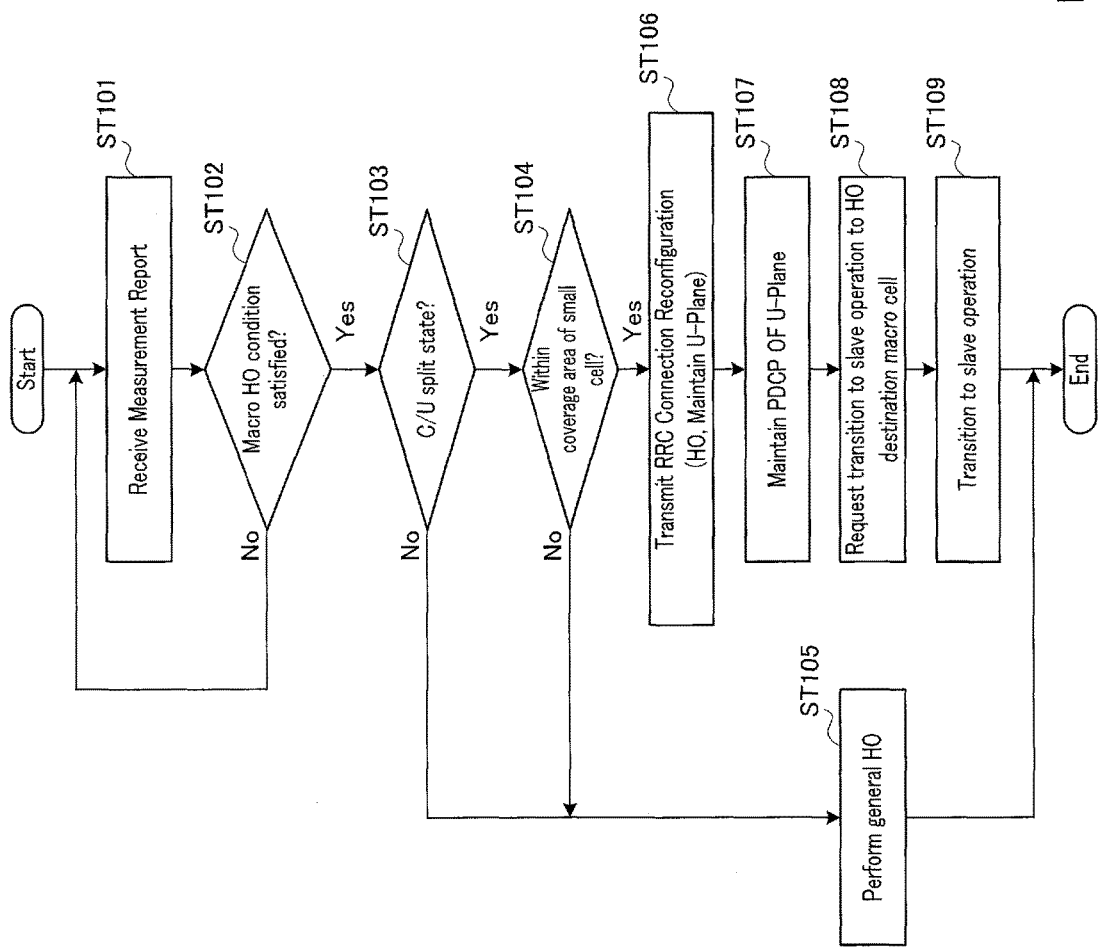
FIG. 5 is a flowchart illustrating an operation example of the base station according to Embodiment 1.

FIG. 5 is a flowchart illustrating a flow of handover processing of a macro cell in base station 100 which is the handover source (source cell).

In FIG. 5, base station 100 receives Measurement Report from terminal 200 in ST101. For example, Measurement Report contains information indicating the reception quality between base station 100 (macro cell) and terminal 200 and information indicating the reception quality between a small cell and terminal 200.

In ST102, base station 100 determines whether a macro cell handover condition is satisfied or not on the basis of Measurement Report. For example, base station 100 determines that the macro cell handover condition is satisfied when the reception quality level between base station 100 and terminal 200, which is indicated in Measurement Report, is less than a given threshold, and the reception quality level between the other macro cell and terminal 200 is not less than the threshold. When the macro cell handover condition is not satisfied (ST102: No), base station 100 returns to the processing of ST101.

Meanwhile, when the macro cell handover condition is satisfied (ST102: Yes), base station 100 determines whether or not the communication form for terminal 200 is a C/U split state in ST103. When the communication form for terminal 200 is not a C/U split state (ST103: No), base station 100 advances to the processing of ST105.

When the communication form for terminal 200 is a C/U split state (ST103: Yes), base station 100 determines whether terminal 200 is located within the coverage area of the small cell or not (whether the condition of being within the coverage area of the small cell is satisfied or not) in ST104. When terminal 200 is not located within the coverage area of the small cell (ST104: No), base station 100 proceeds to the processing of ST105.

When the communication form for terminal 200 is not a C/U split state (ST103: No) or terminal 200 is not located within the coverage area of the small cell (ST104: No), base station 100 performs normal handover processing in ST105. More specifically, base station 100 performs switching of a macro cell performing control of C-Plane. Accordingly, the communication paths of C-Plane data and U-Plane data are switched to the handover-destination macro cell from base station 100 (handover source) (e.g., see FIGS. 1 and 2).

Meanwhile, when the communication form for terminal 200 is a C/U split state (ST103: Yes) and terminal 200 is located within the coverage area of the small cell (ST104: Yes), base station 100 determines handover of the physical channel of C-Plane. Stated differently, base station 100 determines to continue control of C-Plane by base station 100. More specifically, base station 100 continues control of the communication processing of the U-Plane.

In this case, base station 100 transmits to terminal 200 RRC Connection Reconfiguration containing information instructing maintaining of the communication configuration of U-Plane and information indicating reconfiguration of connection (handover) in the physical channel of C-Plane (ST106).

Moreover, base station 100 keeps the parameter (such as encryption parameter) used in security processing performed in the PDCP layer of U-Plan (ST107).

Furthermore, base station 100 transmits to the handover-destination macro cell, using an X2 interface, "C-Plane Slave Request" requesting transition to a C-Plane slave operation (ST108).

Base station 100 transitions to the state of C-Plane slave operation (ST109). More specifically, base station 100 (master cell) transmits C-Plane data to the handover-destination macro cell and transmits U-Plane data to the small cell.

[Operations of Terminal 200]

Figure 6:
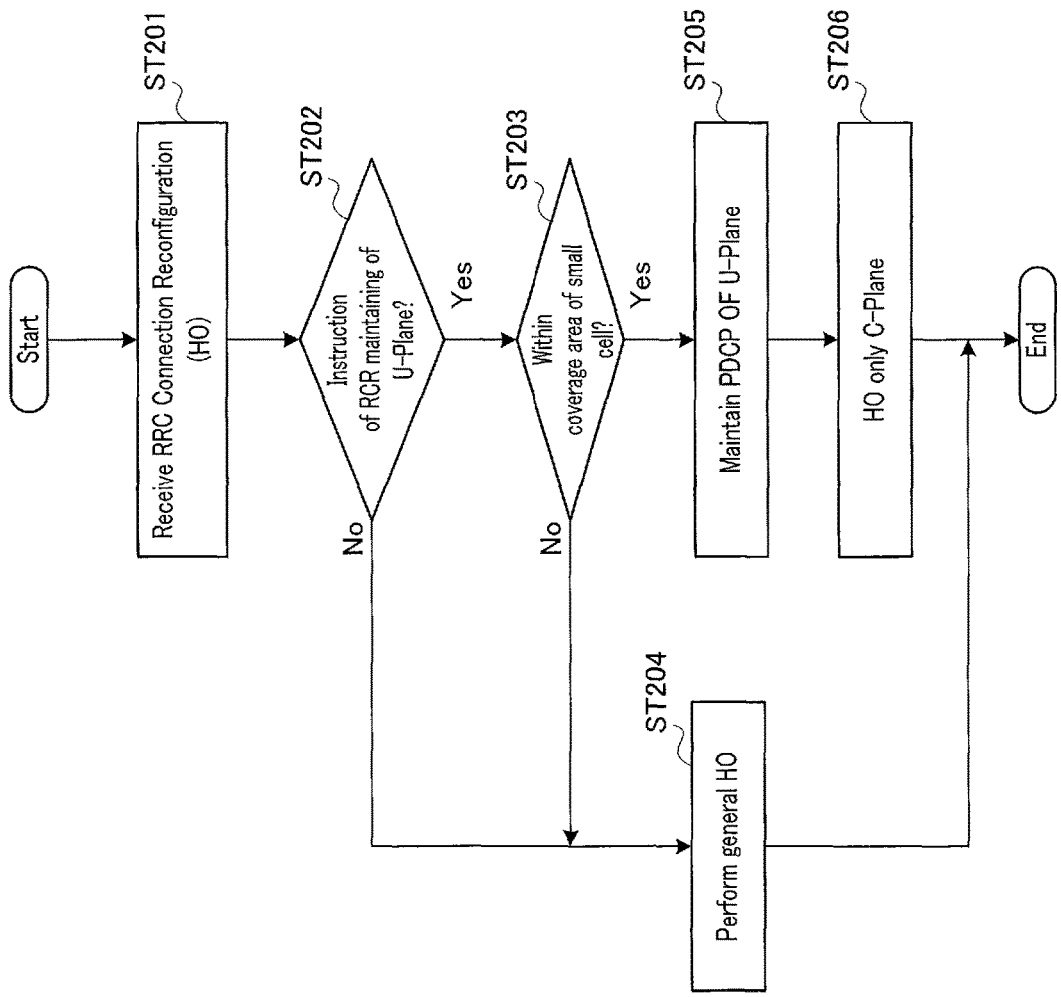
FIG. 6 a flowchart illustrating an operation example of the terminal according to Embodiment 1.

FIG. 6 is a flowchart illustrating a flow of macro-cell handover processing in terminal 200.

In FIG. 6, terminal 200 receives RRC Connection Reconfiguration (RCR) instructing reconfiguration of connection in communication with the handover-destination macro cell from base station 100 (handover source) in ST201. When base station 100 determines to perform the C-Plane slave operation (In case of Yes in ST104 illustrated in FIG. 5), this RRC Connection Reconfiguration contains information instructing maintaining of the communication configuration of U-Plane and information instructing handover (reconfiguration of connection) of the physical channel of C-Plane.

In ST202, terminal 200 determines whether the RRC Connection Reconfiguration received in ST201 contains the information instructing maintaining of the communication configuration of U-Plane or not. When the information instructing maintaining of the communication configuration of U-Plane is not contained (ST202: No), terminal 200 advances to the processing of ST204.

Meanwhile, when the information instructing maintaining of the communication configuration of U-Plane is contained (ST202: Yes), terminal 200 determines in ST203 whether terminal 200 is located within the coverage area of the small cell (whether the condition of being within the coverage area of the small cell is satisfied). When terminal 200 is not located within the coverage area of the small cell (ST203: No), terminal 200 proceeds to the processing of ST204.

When the information instructing maintaining of the communication configuration of U-Plane is not contained (ST202: No) or terminal 200 is not located within the coverage area of the small cell (ST203: No), terminal 200 performs general handover processing in ST204. More specifically, terminal 200 switches a macro cell that performs C-Plane operations to another. Accordingly, the communication paths of C-Plane data and U-Plane data are switched from base station 100 (handover source) to the handover-destination macro cell (e.g., see FIGS. 1 and 2).

Meanwhile, when the information instructing maintaining of the communication configuration of U-Plane is present (ST202: Yes) and terminal 200 is located within the coverage area of the small cell (ST203: Yes), terminal 200 determines to maintain the communication configuration of U-Plane. For example, terminal 200 maintains a parameter (such as encryption parameter) used in security processing performed in the PDCP layer of U-Plane (ST205).

Terminal 200 performs handover processing for only the physical channel of C-Plane (ST206). Accordingly, terminal 200 transmits and receives C-Plane data to and from the handover-destination macro cell. Meanwhile, terminal 200 transmits and receives U-Plane data to and from the small cell using the communication configuration that has been used before handover.

Next, a description will be given of an operation example of the handover processing described above.

Figure 7:
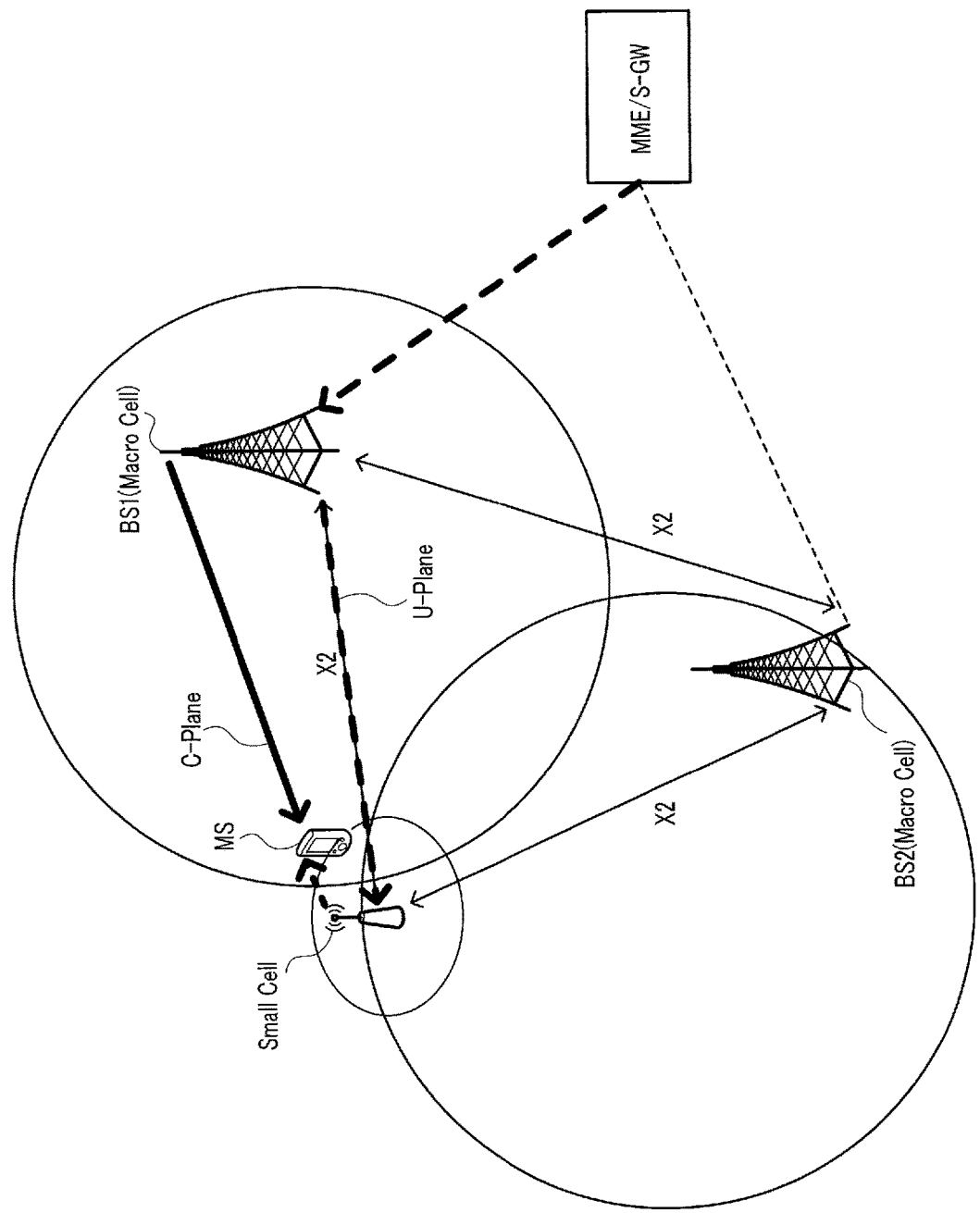
FIG. 7 is a diagram illustrating an operation example of handover processing in a communication system according to Embodiment 1.
Figure 8:
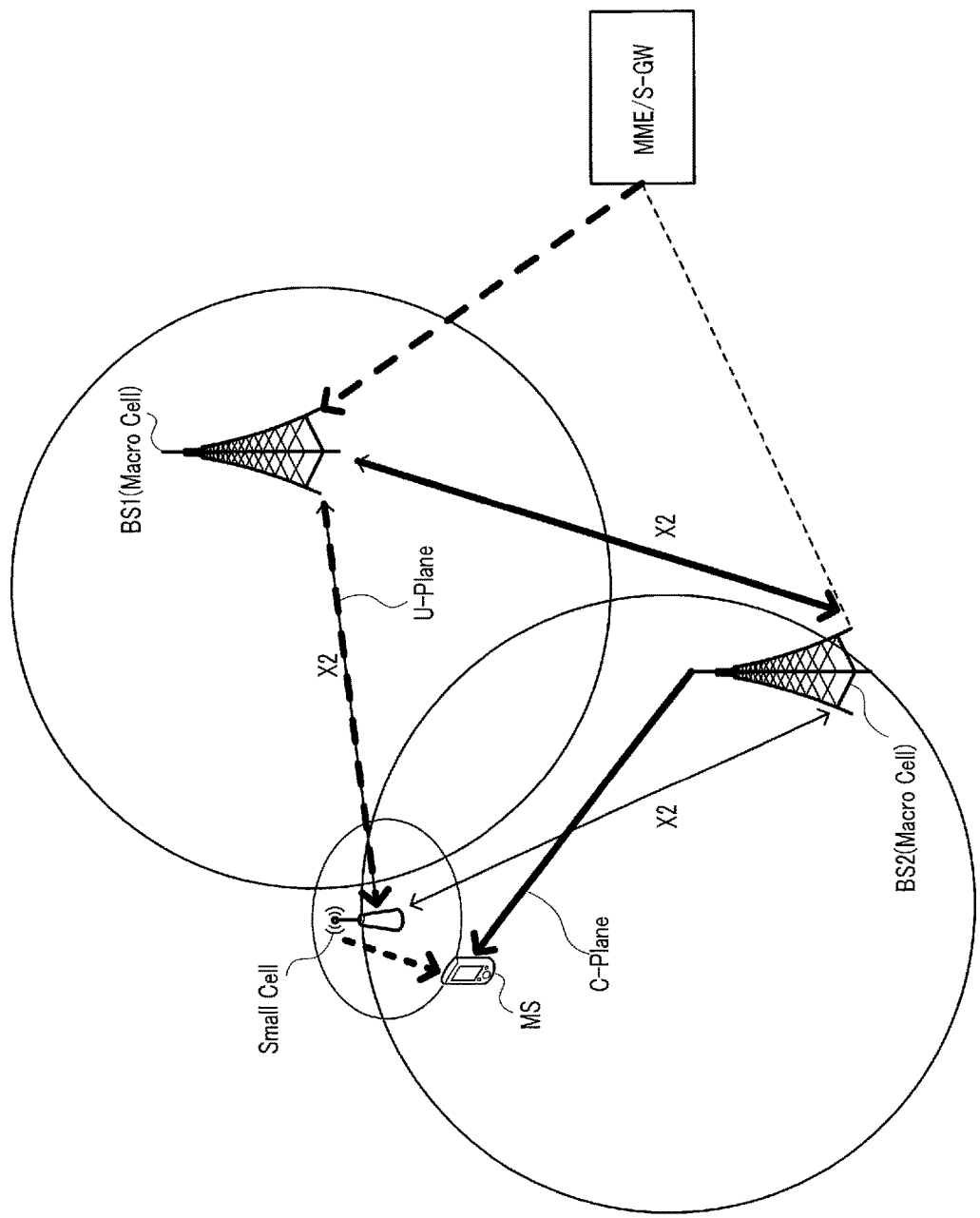
FIG. 8 is a diagram illustrating the operation example of the handover processing in the communication system according to Embodiment 1.

FIG. 7 is a diagram illustrating an example of C-Plane and U-Plane operations before handover in the communication system according to the present embodiment, and FIG. 8 is a diagram illustrating the example of C-Plane and U-Plane operations after handover in the communication system according to the present embodiment.

MS moves from the position illustrated in FIG. 7 to the position illustrated in FIG. 8, and handover from BS1 to BS2 for MS is performed. Note that, these positions of MS illustrated in FIGS. 1 and 8 are all in the coverage area of the small cell.

As illustrated in FIG. 7, C-Plane data (solid line) is transmitted from BS1 to MS before handover for MS, U-Plane data (broken lines) is transmitted to MS from the small cell via BS1.

Figure 9:
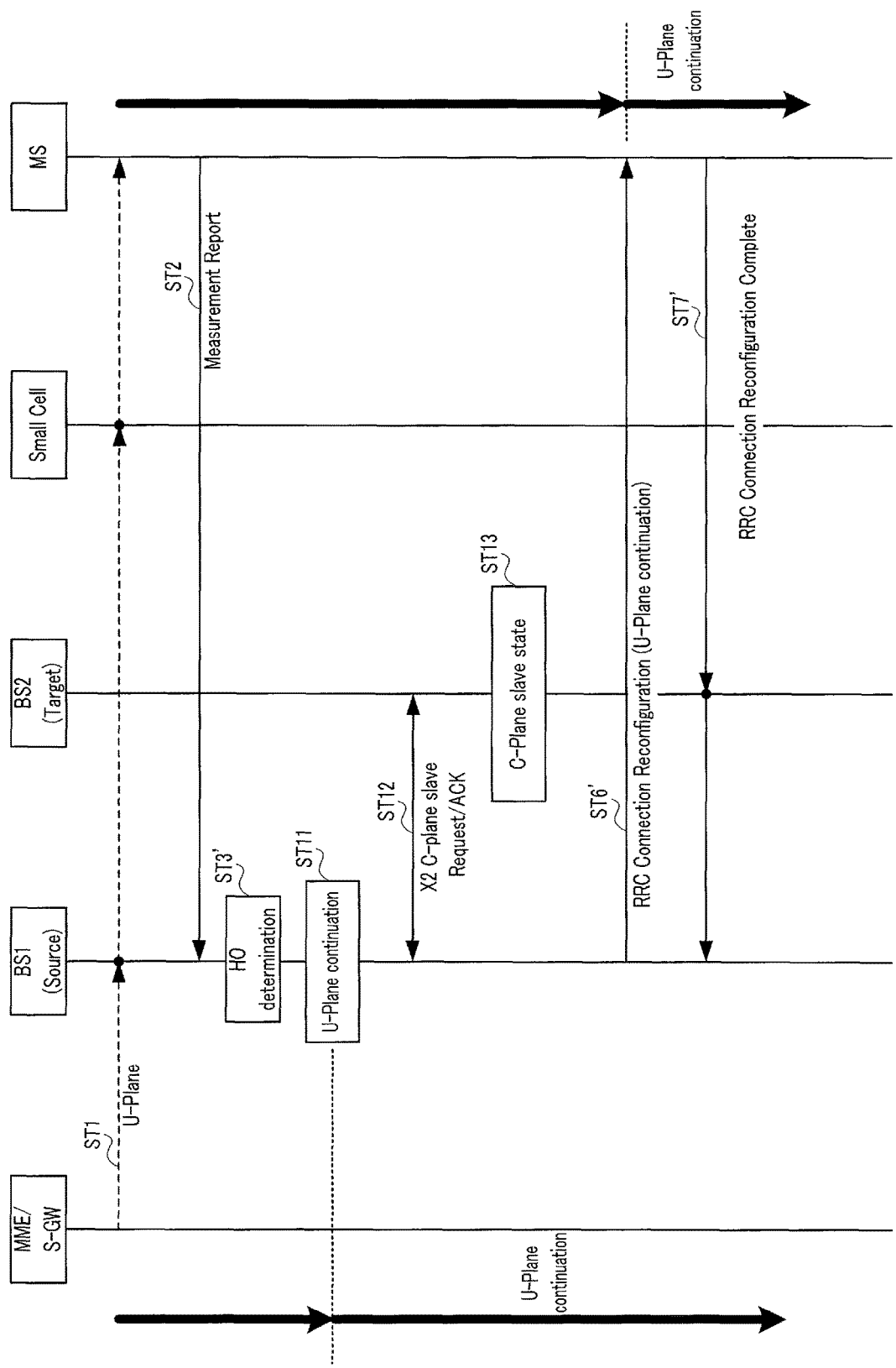
FIG. 9 is a sequence diagram illustrating an operation example of inter-macro-cell handover according to Embodiment 1.

FIG. 9 is a sequence diagram illustrating an operation when handover for MS from BS1 to BS2 is performed. Note that, in FIG. 9, processes similar to the processes in FIG. 2 are assigned the same reference numerals and their descriptions will not be repeated.

In FIGS. 7 to 9, BS1 and BS2 each include the configuration (FIG. 3) of base station 100 and MS includes the configuration (FIG. 4) of terminal 200.

In FIG. 9, BS1 determines whether handover from BS1 to another macro cell is required or not on the basis of Measurement Report, the C/U split state of MS, and within-coverage-area state of MS in the small cell (corresponding to ST102 to ST104 illustrated in FIG. 5) in ST3'. In FIG. 9, BS1 determines to perform handover to BS2 on the basis of C-Plane slave operation. More specifically, BS1 determines handover of the physical channel of C-Plane.

In this case, BS1 continues control of the communication processing of U-Plane (corresponding to ST107 illustrated in FIG. 6) in ST11. More specifically, BS1 continues forwarding processing of U-Plane data to the small cell. Accordingly, as illustrated in FIG. 9, the U-Plane communication is continued in BS1 without being influenced by the handover processing of C-Plane.

In ST12, BS1 transmits a C-Plane Slave Request to BS2 which is the handover destination, and when accepting the C-Plane Slave Request, BS2 transmits ACK for the request to BS1 (corresponding to ST108 illustrated in FIG. 5). Accordingly, BS2 transitions to the state of C-Plane Slave operation in ST13. More specifically, BS2 performs a C-Plane Slave operation to relay C-Plane data between BS1 and the terminal.

In ST6', BS1 transmits RRC Connection Reconfiguration containing information instructing maintaining (continuing) of the U-Plane connection to the handover target MS. MS continues using the communication configuration of U-Plane (corresponding to ST205 illustrated in FIG. 6). Furthermore, MS performs C-Plane handover (corresponding to ST206 illustrated in FIG. 6). Accordingly, as illustrated in FIG. 9, U-Plane communication is continued in MS without being influenced by the handover processing of C-Plane.

Upon completion of the handover processing of C-Plane, in ST7', MS transmits RRC Connection Reconfiguration Complete to BS1 via BS2 (ST7'). From this point forward, MS performs C-Plane data communication with BS2, and BS2 relays C-Plane data between MS and BS1.

As described above, when BS1 continues control of the communication processing of U-Plane, BS1 (master cell) causes BS2 (slave cell) to relay C-Plane data. Accordingly, the C-Plane data transmitted from BS1 to MS before handover (FIG. 7) is transmitted to MS via BS2 from BS1 after handover (FIG. 8). In FIG. 8, the reception quality between MS and BS2 is more favorable than the reception quality between MS and BS1, so that MS can transmit and receive C-Plane data with favorable reception quality.

Meanwhile, BS1 (master cell) which is the handover source of C-Plane continues control of the communication processing of U-Plane (i.e., control of C-Plane). More specifically, BS1 continues control of the data communication path for MS, and RRC control including control of security processing in the PDCP layer. More specifically, BS1 does not transmit a data path change request (Path switch Request, see FIG. 2) to the core network.

For this reason, the communication path of U-Plane before handover (FIG. 7) is maintained even after handover (FIG. 8). Moreover, MS maintains the connection configuration of U-Plane, including security processing. Accordingly, as illustrated in FIG. 9, U-Plane data is continued even during handover processing in the physical channel of C-Plane (ST11 to ST13, ST6' and ST7' illustrated in FIG. 9). More specifically, transmission and reception of U-Plane data is continuously performed between the small cell and MS without being influenced by the handover processing of C-Plane data.

As described above, in a case where inter-macro-cell handover is required for MS whose communication form is a C/U split state, base station 100 (macro cell) according to the present embodiment continues the communication processing of U-Plane and causes handover of only the physical channel of C-Plane when this MS is within the coverage area of the small cell.

Moreover, terminal 200 according to the present embodiment continues using the communication configuration of U-Plane without reconfiguration of connection of U-Plane and performs only C-Plane handover when macro cell (base station 100) instructs maintaining of the communication configuration of U-Plane, in a case where the communication form is a C/U split state and terminal 200 is within the coverage area of the small cell.

More specifically, even in a case where macro cell (i.e., C-Plane) handover for terminal 200 in a C/U split occurs, base station 100 and terminal 200 continue the U-Plane communication when terminal 200 is connected to the small cell with favorable reception quality. In this manner, according to the present embodiment, even when inter-macro-cell handover occurs, the U-Plane data communication in the small cell can be continued. For example, terminal 200 connected to a small cell disposed near the boundary of a macro cell can continue data communication with the small cell without interruption even when inter-macro-cell handover occurs often.

Embodiment 2

When macro cell handover fails, communication between the macro cell and the terminal is disconnected, and the terminal can no longer perform communication until reconnection of communication is completed. In this respect, PTL 1 discloses a method of suppressing handover failures by transmitting and receiving signals related to handover processing between the macro cell and terminal via a small cell during macro cell handover.

However, in PTL 1, there is a problem in that even when the reception quality between a small cell and a terminal is favorable, as described above, disconnection of U-Plane communication occurs in association with switching of C-Plane communication (macro cell) in a communication system in a C/U split state.

In a heterogeneous network, there may be a case where a macro cell and a small cell are configured as different systems, respectively. A case where a macro cell is an LTE system base station but a small cell is a non-LTE system base station can be cited as an example. In this case, the method of performing C-Plane handover of a macro cell via a small cell as in PTL 1 does not allow a small cell to perform transmission and reception processing of C-Plane data with a macro cell when the macro cell and the small cell belong to different systems.

In this respect, in this embodiment, a description will be given of a method in which, even when handover fails, U-Plane communication is continued regardless of the systems to which macro cells and a small cell belong.

Basic configurations of base stations and a terminal according to this embodiment are similar to those of Embodiment 1, so that a description will be given with the descriptions of FIG. 3 (base station 100) and FIG. 4 (terminal 200) incorporated herein.

Figure 10:
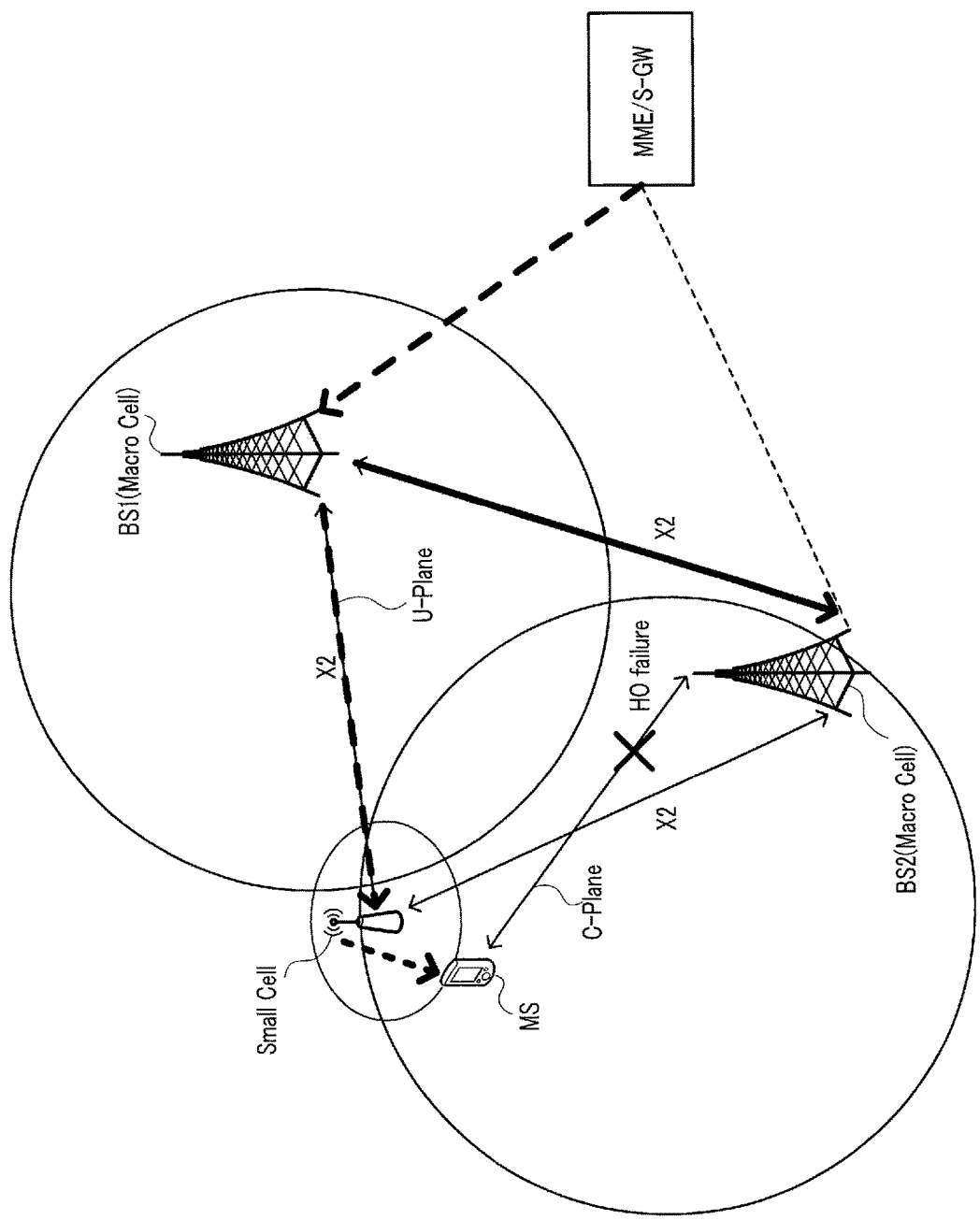
FIG. 10 is a diagram illustrating a configuration example of a network according to Embodiment 2.

FIG. 10 is a diagram illustrating an example of C-Plane and U-Plane operations when handover processing of the physical channel of C-Plane is performed in a communication system according to this embodiment.

FIG. 10 illustrates a state where handover of the physical channel of C-Plane has failed. This handover failure, for example, occurs when reception of a message (RRC Connection Reconfiguration) to MS from a handover-source macro cell (BS1) fails, or when reception of a message (RRC Connection Reconfiguration Complete) from MS to a handover-destination macro cell (BS2) fails.

Hereinafter, a description will be given of, as an example, a case where transmission of RRC Connection Reconfiguration Complete from MS to a handover-destination macro cell (BS2) fails (handover failure).

Figure 11:
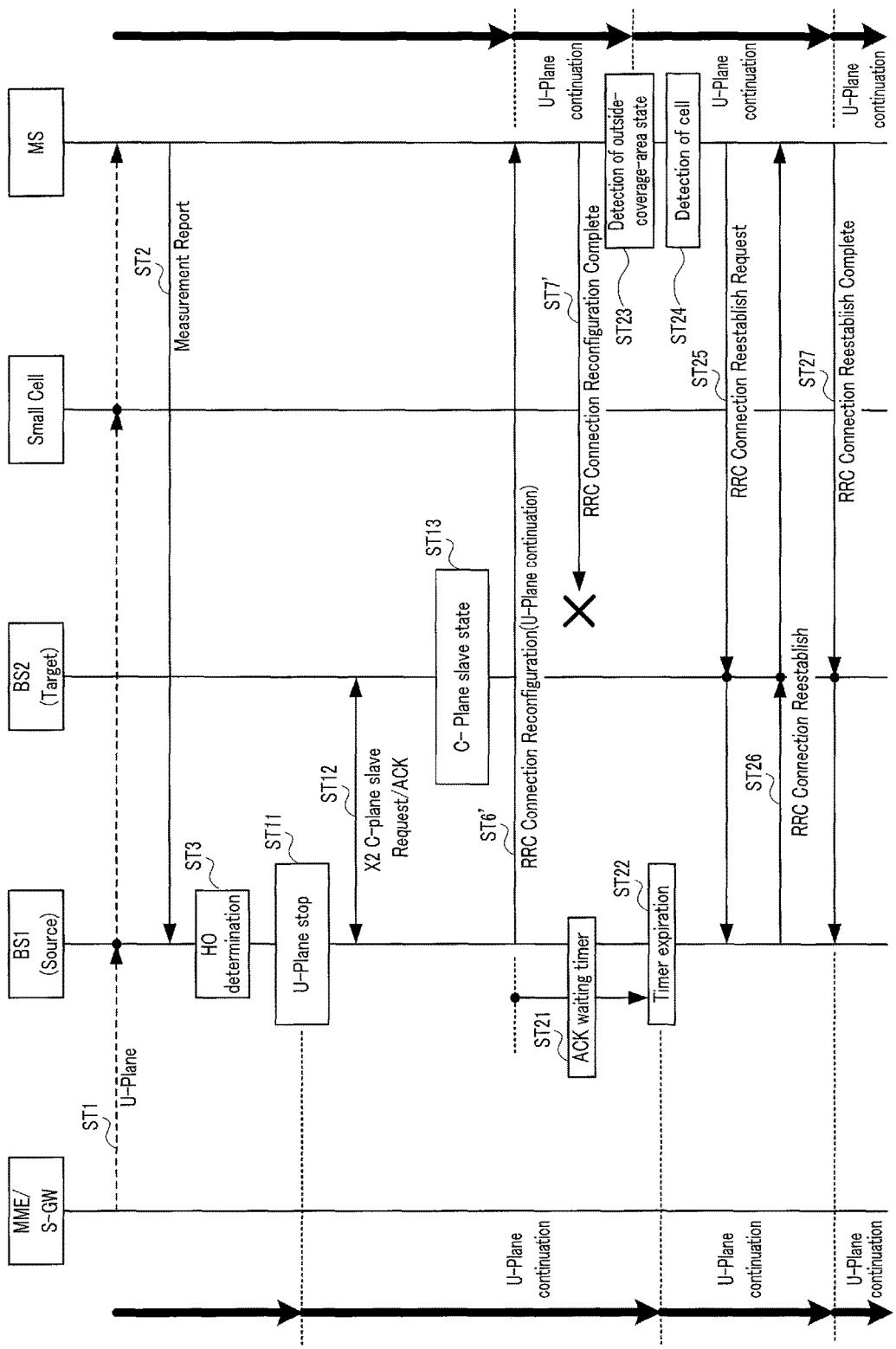
FIG. 11 is a sequence diagram illustrating an operation example of inter-macro-cell handover according to Embodiment 2.

FIG. 11 is a sequence diagram illustrating an operation of a case where handover for MS from BS1 to BS2 is performed in the communication system illustrated in FIG. 10. Note that, processes similar to those of FIGS. 2 and 9 are assigned the same reference numerals in FIG. 11 and their descriptions will not be repeated.

In FIG. 11, communication of RRC Connection Reconfiguration Complete from MS to BS2 fails in ST7'. In other words, although the U-Plane communication is continued as described in Embodiment 1, the C-Plan communication becomes in a state of being disconnected.

BS1 (slave radio-resource control section 110) starts a timer for measuring time for a response (ACK) to this RRC Connection Reconfiguration at a timing for transmitting RRC Connection Reconfiguration to MS in ST6' (ST21).

Upon expiration of the timer after a given period from the start of measuring time in ST21 passes (ST22), BS1 (U-Plane continuation determining section 108) determines whether MS which is the transmission destination of RRC Connection Reconfiguration in ST6' is within the coverage area of the small cell or not (i.e., whether MS is capable of communicating with the small cell or not) on the basis of the reception quality between MS and the small cell. When MS is within the coverage area of the small cell, BS1 determines to continue control of the communication processing of U-Plane for this MS. Accordingly, as illustrated in FIG. 11, after the expiration of the timer in ST22, BS1 continues the control of U-Plane. Meanwhile, when MS is outside the coverage area of the small cell, BS1 stops control of the communication processing of U-Plane for this MS (not illustrated).

Meanwhile, MS (outside-coverage-area determining section 203) detects that MS is outside the coverage area of BS2 after transmission of RRC Connection Reconfiguration Complete in ST7' (ST23). In this case, MS (U-Plane continuation determining section 204) determines whether MS is within the coverage area of the small cell or not (i.e., whether MS is capable of communicating with small cell or not) on the basis of the reception quality between the MS and the small cell. When MS is within the coverage area of the small cell, MS determines to continue the U-Plane communication. Accordingly, as illustrated in FIG. 11, even for detection of the outside-of-coverage area state in ST23, MS continues the U-Plane connection. Meanwhile, when MS is outside the coverage area of the small cell, MS stops the U-Plane communication (resets the configuration of communication) (not illustrated).

As described above, in a case where RRC Connection Reconfiguration Complete is not received within a given period after transmission of RRC Connection Reconfiguration (ST6') (in case of handover failure), BS1 (base station 100) continues control of the communication processing of U-Plane when MS (terminal 200) is within the coverage area of the small cell but stops the control of the communication processing of U-Plane when MS is not within the coverage area of the small cell. In addition, in a case where MS (terminal 200) detects that the MS is outside the coverage area of the other macro cell after transmission of RRC Connection Reconfiguration Complete (handover failure), MS (terminal 200) continues the communication processing of U-Plane when MS (terminal 200) is located within the coverage area of the small cell but stops the communication processing of U-Plane when MS is not located within the coverage area of the small cell.

Accordingly, as illustrated in FIG. 10, even in a state where C-Plane handover has failed, the U-Plane communication is continued in BS1 and MS, and in the same manner as before handover, U-Plane data is transmitted and received between the small cell and MS.

Next, after detection of the outside-coverage-area state, MS (outside-coverage-area determining section 203) detects BS2 which is the handover-destination macro cell (ST24). In this case, MS (radio-resource control section 205) transmits, to the detected BS2, RRC Connection Reestablish Request for requesting reconnection (ST25). Since a C-Plane slave operation is configured in ST13, BS2 forwards the received RRC Connection Reestablish Request to BS1 (master cell) without any change.

Upon reception of RRC Connection Reestablish Request, BS1 (slave radio-resource control section 110) transmits RRC Connection Reestablish instructing reconnection of U-Plane to MS via BS2 (slave cell) (ST26).

MS performs reconnection processing in accordance with RRC Connection Reestablish after completion of reconnection and transmits RRC Connection Reestablish Complete to BS1 via BS2 (ST27). Moreover, in this case, when MS is within the coverage area of the small cell, MS determines to continue the U-Plane connection. Likewise, when MS is located within the coverage area of the small cell, BS1 determines to continue the U-Plane connection for this MS. Accordingly, as illustrated in FIG. 11, BS1 and MS continue U-Plane communication after reconnection of C-Plane communication between BS1 and MS via BS2. Meanwhile, when MS is located outside the coverage area of the small cell, BS1 and MS stop the U-Plane communication (reset the communication configuration) (not illustrated).

As described above, in a case where RRC Connection Reconfiguration Complete is not received within a given period and then BS1 and MS are reconnected to each other via BS2 (slave cell), BS1 (base station 100) continues control of the communication processing of U-Plane when MS is located within the coverage area of the small cell, but stops the control of the communication processing of U-Plane when MS is not located within the coverage area of the small cell. Moreover, in a case where BS1 and MS are reconnected to each other via BS2 (slave cell) after detection of MS (terminal 200) being outside the coverage area of BS2, MS (terminal 200) continues the communication processing of U-Plane when MS is located within the coverage area of the small cell, but stops the communication processing of U-Plane when MS is not located within the coverage area of the small cell.

Accordingly, as illustrated in FIG. 10, even when C-Plane communication is reconnected after C-Plane handover failure, U-Plane communication is maintained in BS1 and MS, and in the same manner as before handover, U-Plane data is transmitted and received between the small cell and MS.

As described above, according to this embodiment, in a case where terminal 200 is located within the coverage area of a small cell (when terminal 200 is capable of communicating with the small cell), U-Plane communication can be continued without being disconnected even when C-Plane handover fails.

Moreover, according to this embodiment, both of the processing related to C-Plane handover and the processing related to U-Plane communication (continuation determination or the like for the communication processing) are performed between a macro cell (base station 100) and terminal 200 not via a small cell. For this reason, according to this embodiment, even in a case where macro cells and a small cell belong to different systems in a heterogeneous network, U-Plane communication can be continued regardless of the systems to which the macro cells and small cell belong.

Each embodiment of the present invention has been described thus far.

Note that, in the embodiments, a description has been given of a case where the presence of terminal 200 in the coverage area of a small cell is considered as a condition for continuing the communication processing of U-Plane. However, even in a case where terminal 200 is within the coverage area of a small cell, interruption of U-Plane communication causes no problem when this terminal 200 is not in data communication. In this respect, even in a case where terminal 200 is within the coverage area of a small cell, general handover processing (for example, see FIG. 2) may be preferentially performed without continuation of the communication processing of U-Plane when this terminal 200 is not in data communication. More specifically, base station 100 (master cell) continues control of the communication processing of U-Plane when handover for terminal 200 in a C/U split state is required, terminal 200 is located within the coverage area of a small cell, and also terminal 200 is in data communication.

Moreover, in the embodiments, communication systems of macro cells and a small cell may be different from each other. For example, the macro cells may belong to the LTE system or LTE-Advanced system while the small cell may belong to a communication system using WiFi or a communication system using WiGig. Moreover, the small cell may belong to an LTE system dedicated for U-Plane. In this case, terminal 200 employs a configuration capable of performing communication with both of the communication systems of the macro cells and the small cell.

Note that, in each of the embodiments, a description has been given of a case where the present invention is configured using hardware, but the present invention can be realized by software in cooperation with hardware.

Each functional block used in the description of each embodiment described above is typically realized as an LSI which is an integrated circuit. The functional blocks may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

Furthermore, if future integrated circuit technology replaces LSIs as a result of the advancement of semiconductor technology or other derivative technology, the functional blocks could be integrated by using the future integrated circuit technology. Biotechnology can also be applied.

The disclosure of Japanese Patent Application No. 2015-000313, filed on Jan. 5, 2015, including the specification, drawings, and abstract is incorporated herein by reference in its entirety.

INDUSTRIAL APPLICABILITY

The present invention is useful in mobile communication systems.

REFERENCE SIGNS LIST

100 Base station
101 Inter-base-station communication I/F
102 Core NW communication I/F
103, 201 Terminal communication I/F
104, 202 Control section
105 HO determining section
106 C/U split determining section
107, 203 Outside-coverage-area determining section
108, 204 U-Plane continuation determining section
109, 205 Radio-resource control section
110 Slave radio-resource control section
111 X2 transmission and reception section
112, 206 U-Plane transmission and reception section
113, 207 C-Plane transmission and reception section
200 Terminal

The invention claimed is:

1. A base station in a communication system where a small cell performs user-plane (U-Plane) communication and a macro cell performs control-plane (C-Plane) communication in which control of communication processing of the U-Plane is performed by the macro cell for a terminal, the base station being the macro cell in the communication system and comprising circuitry including:

a first determining section, which, in operation, determines whether handover of the C-Plane from the base station to another macro cell for the terminal is required; and a control section, which, in operation:
in response to a determination that handover is required and an indication that the terminal is located within a coverage area of the small cell, continues the control of the communication processing of the U-Plane; and
in response to a determination that handover is required and an indication that the terminal is located outside the coverage area of the small cell, stops the control of the communication processing of the U-Plane and performs handover processing to the other macro cell.

2. The base station according to claim 1, comprising:
a first transmission and reception section, which, in operation, transmits, to the other macro cell, a first message requesting relay of data of the C-Plane between the base station and the terminal and receives a response to the first message from the other macro cell, when the control of the communication processing of the U-Plane is continued in the control section; and
a second transmission and reception section, which, in operation, transmits, to the terminal, a second message containing information instructing maintaining of a communication configuration of the U-Plane and information instructing reconfiguration of the C-Plane communication with the other macro cell and receives a third message reporting completion of the reconfiguration from the terminal via the other macro cell, when the control of the communication processing of the U-Plane is continued in the control section.

3. The base station according to claim 2, wherein, in response to the third message not being received within a given period from transmission of the second message, the control section:
continues the control of the communication processing of the U-Plane when the terminal is located within the coverage area of the small cell; and
stops the control of the communication processing of the U-Plane when the terminal is not located within the coverage area of the small cell.

4. The base station according to claim 3, wherein, in response to the third message not being received within the given period and the base station and the terminal being reconnected to each other via the other macro cell, the control section continues the control of the communication processing of the U-Plane when the terminal is located within the coverage area of the small cell, but stops the control of the communication processing of the U-Plane when the terminal is not located within the coverage area of the small cell.

5. The base station according to claim 1, wherein the control section continues the control of the communication processing of the U-Plane, when the handover is required, the terminal is located within the coverage area of the small cell, and the terminal is in data communication.

6. The base station according to claim 1, wherein a communication system of the macro cell and a communication system of the small cell are different from each other.

7. The base station according to claim 1, wherein a communication system to which the small cell belongs is an LTE system dedicated for the U-Plane or a communication system using WiGig or a communication system using WiFi.

8. A terminal in a communication system where a small cell performs user-plane (U-Plane) communication and a macro cell performs control-plane (C-Plane) communication in which control of communication processing of the U-Plane is performed by the macro cell for the terminal, the terminal comprising:
transmission and reception circuitry, which, in operation, receives, from the macro cell, a message instructing the C-Plane communication with another macro cell and transmits a response to the message to the other macro cell; and
control circuitry, which, in operation:
in response to the message containing information instructing maintaining of a communication configuration of the U-Plane and an indication the terminal is located within a coverage area of the small cell, continues using the communication configuration of the U-Plane; and
in response to the message containing information instructing maintaining of the communication configuration of the U-Plane and an indication the terminal is outside the coverage area of the small cell, performs reconfiguration of the U-Plane communication.

9. A communication control method in a communication system where a small cell performs user-plane (U-Plane) communication and a macro cell performs control-plane (C-Plane) communication in which control of communication processing of the U-Plane is performed by the macro cell for a terminal, the method comprising:
determining, using configured circuitry, whether handover of the C-Plane from the base station to another macro cell for the terminal is required; and
determining, by the configured circuitry, whether the terminal is located outside a coverage area of the small cell;
in response to a determination that handover is required and a determination that the terminal is not located outside the coverage area of the small cell, continuing the control of the communication processing of the U-Plane;
in response to a determination that handover is required and a determination that the terminal is located outside the coverage area of the small cell, stopping the control of the communication processing of the U-Plane and performing handover processing to the other macro cell.

10. A communication control method in a communication system where a small cell performs user-plane (U-Plane) communication and a macro cell performs control-plane (C-Plane) communication in which control of communication processing of the U-Plane is performed by the macro cell for a terminal, the method comprising:
receiving, from the macro cell, a message instructing the C-Plane communication with another macro cell and transmitting a response to the message to the other macro cell;
determining, using configured circuitry, whether the message contains information instructing maintaining of the communication configuration of the U-Plane;
determining, using the configured circuitry, whether the terminal is located outside a coverage area of the small cell;
in response to a determination the message contains instruction information instructing maintaining of the communication configuration of the U-Plane and a determination that the terminal is not located outside the coverage area of the small cell, continuing using a communication configuration of the U-Plane; and in response to a determination the message contains instruction information instructing maintaining of the communication configuration of the U-Plane and a determination that the terminal is located outside the coverage area of the small cell, performing reconfiguration of the U-Plane.

* * * * *